(12) United States Patent
Cline et al.

(10) Patent No.: US 8,229,269 B2
(45) Date of Patent: Jul. 24, 2012

(54) APPARATUS AND METHODS FOR ATTENUATING AND MEASURING LIGHT PASSED THROUGH A LAUNCH MULTIMODE FIBER

(75) Inventors: Timothy S. Cline, Granite Falls, NC (US); Wesley A. Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 346 days.

(21) Appl. No.: 12/570,853

(22) Filed: Sep. 30, 2009

(65) Prior Publication Data

US 2011/0075969 A1 Mar. 31, 2011

(51) Int. Cl.
*G02B 6/24* (2006.01)
(52) U.S. Cl. ......................................................... 385/140
(58) Field of Classification Search .................. None
See application file for complete search history.

(56) References Cited

U.S. PATENT DOCUMENTS

2004/0042757 A1* 3/2004 Jones et al. .................. 385/140

OTHER PUBLICATIONS

International Electrotechnical Commission, "Fiber-optic communication subsystem test procedures—Part 4-1: Installed cable plant—Multimode attenuation measurement", Annex H, Edition 2.0, Pub. No. IEC 61280-4-1, Jun. 2009, pp. 1-66.

* cited by examiner

*Primary Examiner* — Jerry Rahll

(57) ABSTRACT

An exemplary apparatus includes ferrule offset assemblies each having opposing ferrules with respective ends and respective fiber channels maintained in general relative and adjustable alignment. Offset adjusting devices adjust the relative alignment of the fiber channels to create at least one select fiber channel alignment offset. Respective multimode fibers are disposed in the fiber channels and have a fiber alignment corresponding to the fiber channel alignment. One of the multimode fibers has an end configured to optically couple to a launch multimode fiber, which is connected to a device having a light source. The multimode fiber receives light from the launch multimode fiber so that at least some of the light passes through to the other multimode fiber and then to a power meter. Power measurements for different fiber offsets are then compared to established attenuation values.

18 Claims, 12 Drawing Sheets

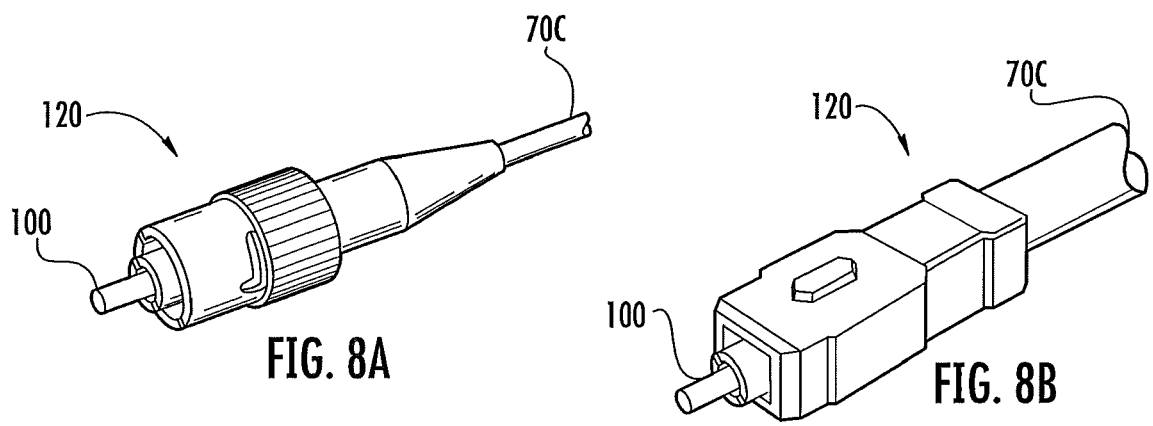
FIG. 8A
FIG. 8B
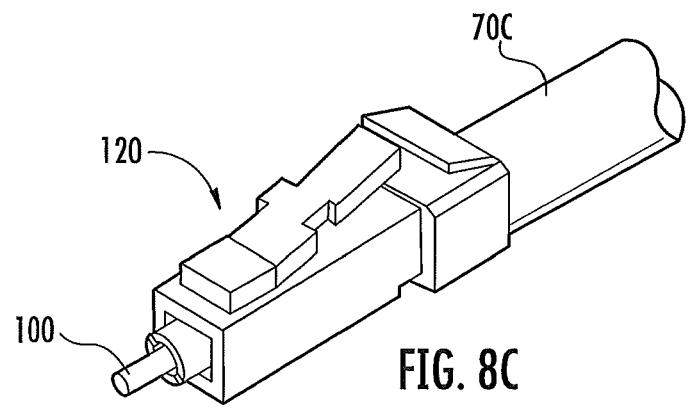
FIG. 8C

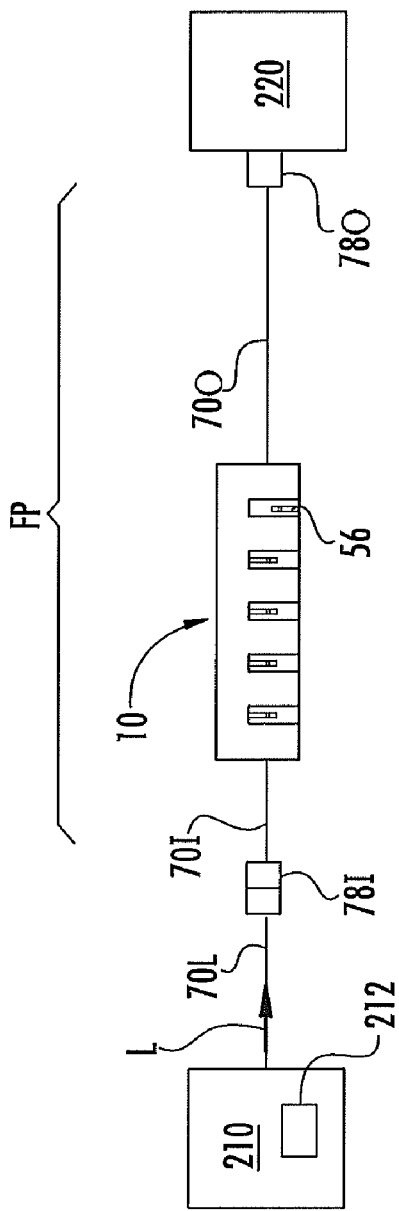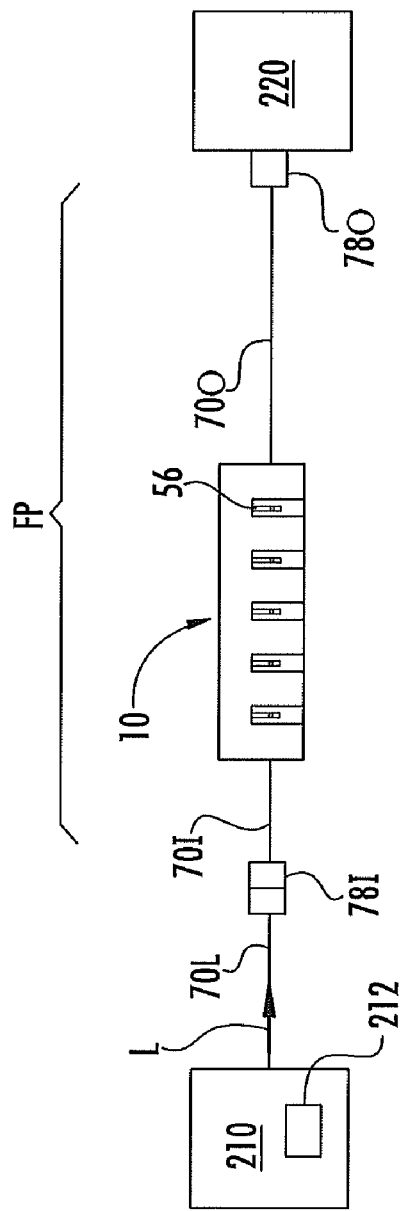

US 8,229,269 B2

APPARATUS AND METHODS FOR ATTENUATING AND MEASURING LIGHT PASSED THROUGH A LAUNCH MULTIMODE FIBER

FIELD

The present disclosure relates to apparatus for causing optical fiber attenuation, and in particular to such apparatus for attenuating and measuring light passed through a launch multimode optical fiber.

BACKGROUND

Typical optical fiber telecommunication systems and networks utilize fiber optic assemblies such as cables, cable assemblies and network components. Certain portions of such systems and networks utilize multimode optical fibers ("multimode fibers"), while other portions utilize single-mode optical fibers ("single-mode fibers").

Multimode fibers have larger cores than single mode fibers and thus can support many more guided modes. However, because of modal dispersion and modal noise, multimode fibers are typically used for short-distance applications, such as communicating between devices in data centers, and usually operate at wavelengths of 850 nm and sometimes 1300 nm. Single-mode fibers are typically used for long-distance applications, such as communicating between data centers, and usually operate at wavelengths of 1310 nm or 1550 nm.

To ensure the operability of telecommunication equipment that uses multimode fibers, standards for measuring multimode fiber attenuation have been established by the Telecommunications Industry Association (TIA) and by the International Electrotechnical Commission (IEC). For example, the standards set forth in IEC 61280-4-1:2009(E) are applicable to attenuation measurements of installed multimode fiber optic cabling for lengths of up to about 2,000 m.

Attenuation measurements can be made by calculating the "encircled flux" of the "launch" multimode fiber cable. A launch multimode fiber cable is connected to a light source and is used to launch light into the installed cabling, as described in the publication TIA TSB 178, entitled "Launch condition guidelines for measuring the attenuation of installed multimode cabling," which document is incorporated by reference herein. The encircled flux is defined as the fraction of cumulative near-field power emitted by the multimode fiber to the total output power of the fiber as a function of radial distance from the optical center of the fiber core. The upper and lower bounds on the encircled flux over a range of fiber radii define an "encircled flux template," which has a region (area) of acceptable performance.

Unfortunately, it is impractical for field technicians to directly measure the encircled flux from the launch multimode fiber cable because it requires a measurement of the near-field power emitted by the multimode fiber. This measurement is difficult to conduct in the field and the equipment used is expensive and environmentally sensitive. However, encircled flux can be measured indirectly by providing a series of offset connections to launch multimode fiber and measuring the transmitted power for each such offset connection. The offset connections produce differential modal attenuation, which can be compared to values when tested by a launch multimode fiber cable known to be at or very close to the encircled flux target. Consequently, limits on the attenuation are easier to measure and are typically used to field test the performance of installed multimode fibers.

To test a launch multimode fiber cable, the IEC recommends that the field technician carry multiple (e.g., a set of three) different jumper cables ("jumpers") each with a different number of fiber offsets. The first jumper has no offset and is connected to launch multimode fiber cable, and a first power measurement is made using a power meter. This power measurement ensures the launch connector is of reference quality and serves as a baseline for the attenuation measurement. The first jumper is removed and a second jumper or set of jumpers having two offsets is then connected to the launch multimode fiber cable. A second power measurement made using a power meter. The second jumper cable is removed and a third jumper cable having five offsets is then connected to the launch multimode fiber cable. A third attenuation measurement is made. The power measurements from all of the different jumper cable connections are then compared to established attenuation values (based on the aforementioned encircled flux template) to determine if the multimode launch system (i.e., the launch multimode fiber cable and the light source to which it is attached) meets the IEC and/or TIA standard for attenuation.

SUMMARY

An aspect of the disclosure is an apparatus for attenuating light passed through a launch multimode fiber and detected by a power meter. The apparatus includes at least one ferrule offset assembly having opposing first and second ferrules with respective first and second ends and first and second fiber channels maintained in general relative and adjustable alignment. The apparatus also includes an offset adjusting device adapted to adjust the relative alignment of the first and second fiber channels to create at least one select fiber channel alignment offset. The apparatus also has first and second multimode fibers having respective first and second ends disposed in the first and second fiber channels to have a fiber alignment corresponding to the fiber channel alignment. The first multimode fiber has an end configured to optically couple to the launch multimode fiber so as to receive the light therefrom, so that at least some of the light passes through the second multimode fiber to the power meter.

Another aspect of the disclosure is an apparatus for attenuating light passed through a launch multimode fiber and detected by a power meter. The apparatus includes a plurality of ferrule offset assemblies optically connected in series by sections of multimode fibers and configured to provide substantially no offset and at least one select offset between adjacent multimode fiber sections via the operation of respective offset adjusting devices. The apparatus also includes input and output multimode fibers. The input multimode fiber is optically connected to the most upstream ferrule offset assembly and is configured to be optically connectable to the launch multimode fiber. The output multimode fiber is optically connected to the most downstream ferrule offset assembly and is configured to be optically connectable to the power meter.

Another aspect of the disclosure is a method of attenuating light passed through a launch multimode fiber connected to a device having a light source. The method includes introducing the light passed from the light source and through the launch multimode fiber into an input end of an optical fiber path. The optical fiber path has sections of multimode fibers arranged in series and configured to provide substantially no offset and at least one select offset between adjacent multimode fiber sections via the operation of at least one offset adjusting device. The method further includes adjusting the fiber offsets. The method also includes, for each fiber offset adjustment, measuring an amount of output power at an output end of the optical fiber path, and determining an attenuation from the measured amounts of output power.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings wherein:

FIG. 8A is a perspective view of an example FC-type of optical fiber connector assembly suitable for holding the offset ferrule and be incorporated into the ferrule offset assembly;

FIG. 8B is a perspective view of an example SC-type of optical fiber connector assembly suitable for holding the offset ferrule and be incorporated into the ferrule offset assembly;

FIG. 8C is a perspective view of an example LC-type of optical fiber connector assembly suitable for holding the offset ferrule and be incorporated into the ferrule offset assembly;

FIG. 14 through FIG. 19 are schematic diagrams of the attenuation measurement apparatus of the present disclosure being used to measure the attenuation of a launch multimode fiber connected to a device having a light source, with the different Figures illustrating different fiber offset settings of the apparatus as represented by different lever positions.

DETAILED DESCRIPTION

Reference is now made to embodiments of the disclosure, exemplary embodiments of which are illustrated in the accompanying drawings. In the description below, like elements and components are assigned like reference numbers or symbols. Also, the terms "upstream" and "downstream" are relative to the direction in which light travels, so that "upstream" is closer to the light source than "downstream." With momentary reference to FIG. 14 to illustrate this point, light L travels from light source 212 in device 210 and then downstream through a launch multimode fiber 70L, through input multimode fiber 70I, through apparatus 10, through output multimode fiber 70O and then to power meter 220.

Figure 1:
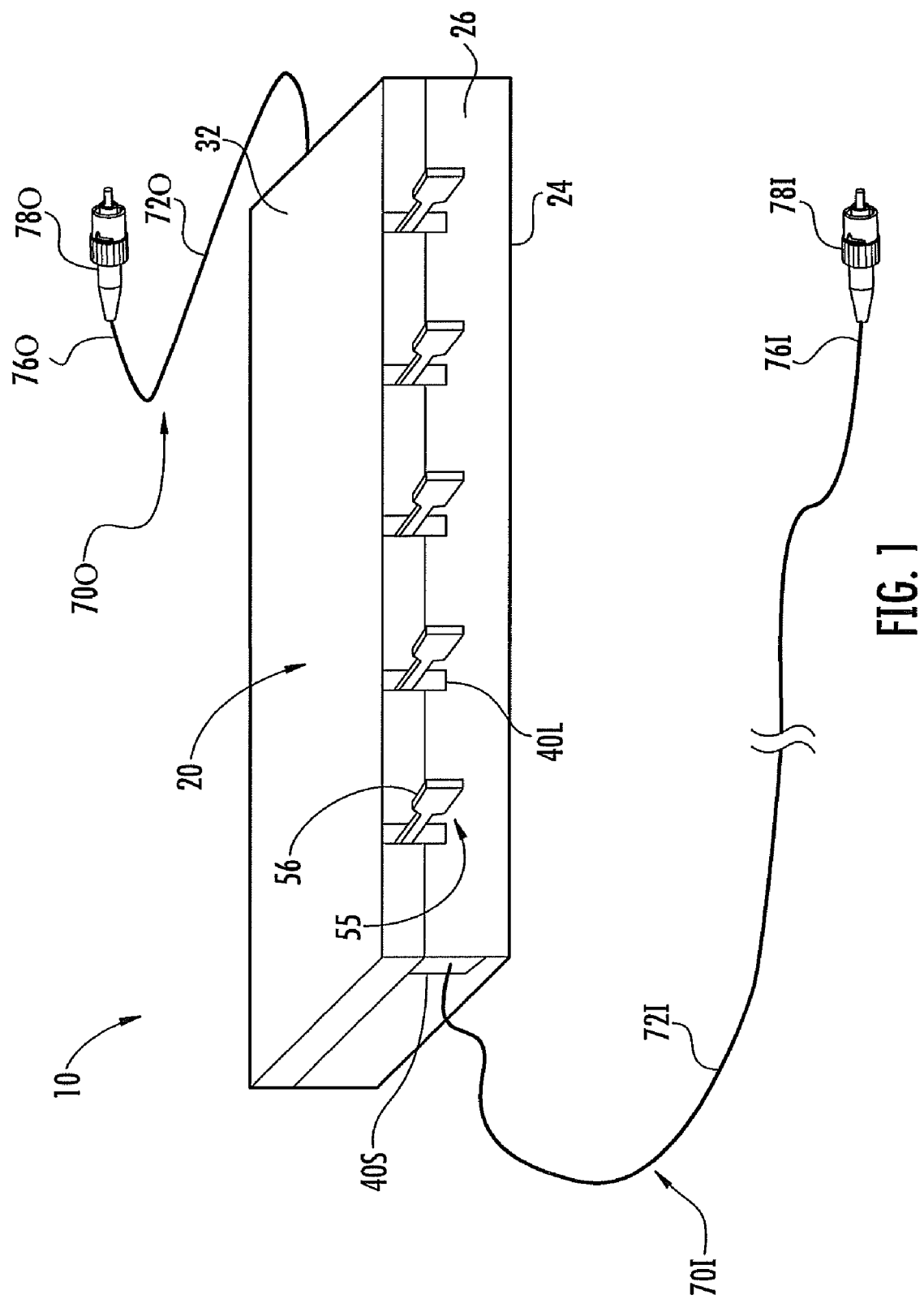
FIG. 1 is a perspective view of an example apparatus used to measure the attenuation of a launch multimode fiber.
Figure 2:
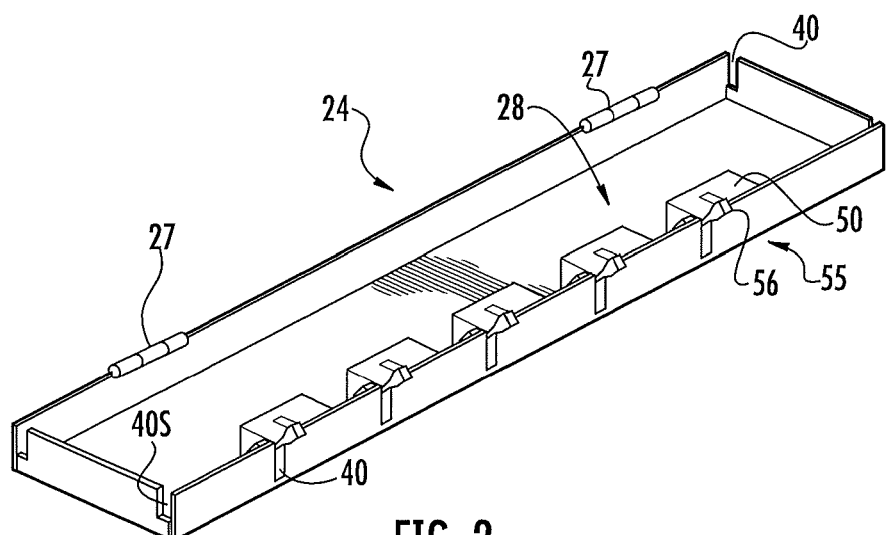
FIG. 2 is a perspective view similar to that of FIG. 1, but with the top cover of the housing removed to show the ferrule offset assemblies within the housing interior.

FIG. 1 is a perspective view of an example apparatus 10 used to measure in the field the attenuation of light passed through a launch multimode fiber. Apparatus 10 includes an optional rectangular, box-like housing 20 having a bottom section 24 with sidewalls 26 that define an interior 28 as shown in FIG. 2. Housing 20 also includes a removable or openable top section or cover 32 shown in FIG. 2 and FIG. 3 as removed from bottom section 24 so that interior 28 is visible. In an example embodiment, top cover 32 is attached to bottom section 24 via one or more hinges 27 so that the top cover can be opened while remaining attached to the bottom section.

In an example embodiment, one of the longer sidewalls 26 of bottom section 24 includes at least one opening 40L formed therein. Multiple openings 40L are shown by way of example. Also in an example embodiment, each of shorter sidewalls 26 includes one or more openings 40S.

Apparatus 10 further includes at least one ferrule offset assembly 50 arranged in bottom section 24 within interior 28 and adjacent the corresponding at least one opening 40L. A perspective view of an example ferrule offset assembly 50 is shown in FIG. 4. Ferrule offset assembly 50 includes a support structure 184 with an input side 52 and an output side 54. Multiple ferrule offset assemblies 50 are shown in the embodiments of apparatus 10 shown in FIG. 1 through FIG. 3 by way of example. An exemplary number of ferrule offset assemblies is five, which corresponds to an example number of concatenated fiber offsets used to measure the attenuation of the multimode fiber under test.

Ferrule offset assembly 50 includes an offset adjusting device 55, shown by way of example as a mechanical lever 56 that extends through the corresponding sidewall opening 40L. Other types of offset adjusting devices 55 suitable for use herein include, for example, electronic devices such as motors, actuators, switches and combinations thereof, and other mechanical devices such as for example, pushrods, knobs, pushbuttons and combinations thereof Different types of ferrule offset assemblies 50 are discussed in greater detail below.

Figure 3:
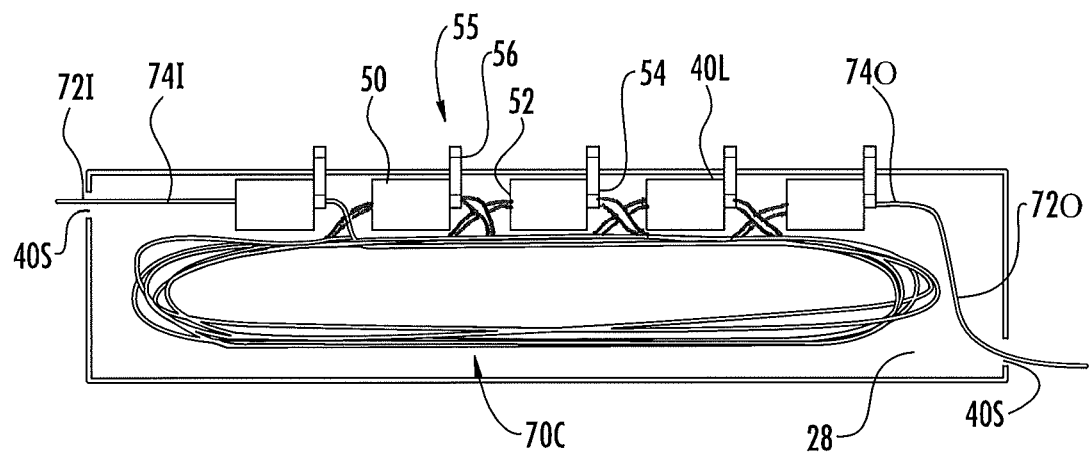
FIG. 3 is a top-down view of the bottom section of the housing of the apparatus of FIG. 1, and illustrates a coiled length of connecting multimode fiber that connects adjacent ferrule offset assemblies, and also shows the input and output multimode fiber sections that lead into and out of the housing.
Figure 4:
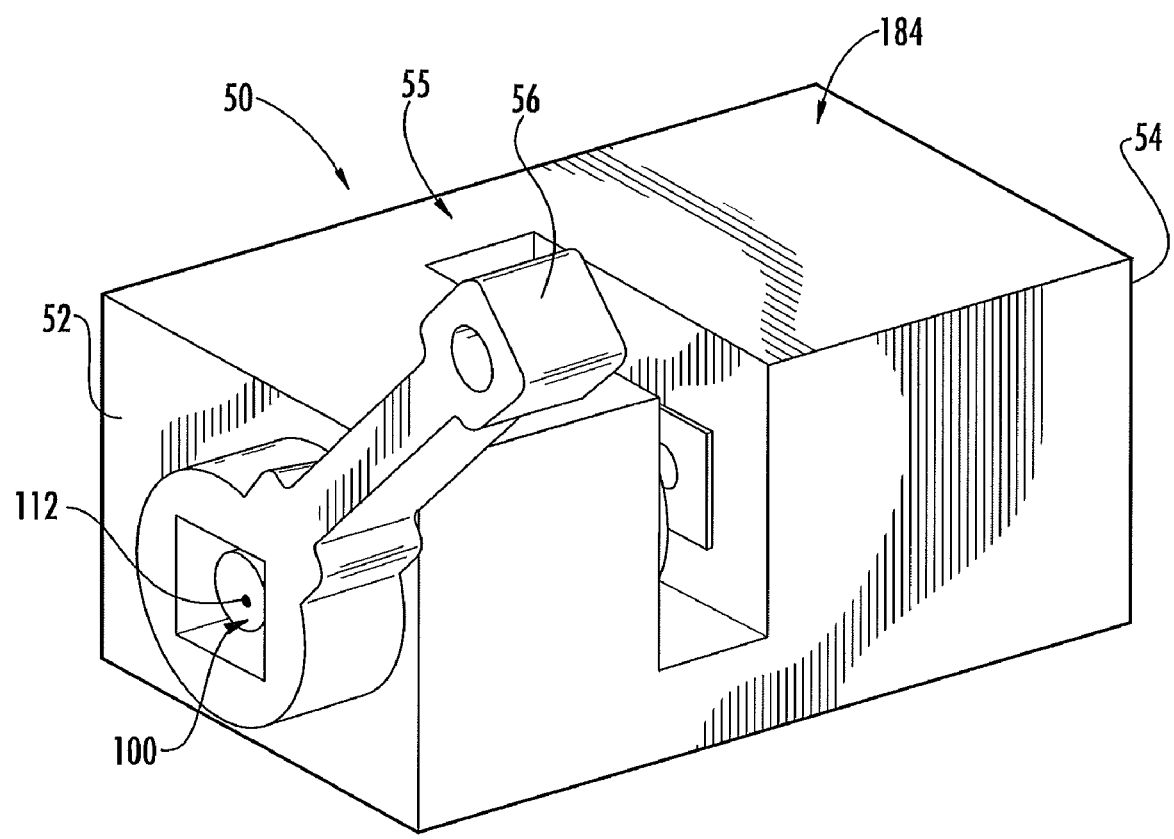
FIG. 4 is a perspective view of an example ferrule offset assembly showing an offset adjusting device in the form of a lever connected to one of the two opposing offset ferrules within the assembly, wherein the lever initiates rotation of the offset ferrule to provide a select offset between multimode fibers held in the opposing offset ferrules.

With reference to FIG. 1 through FIG. 3, apparatus 10 further includes a length (e.g., 1 m) of input multimode fiber 70I that includes a section 72I having proximal end 74I, and a distal end 76I with an optical fiber connector assembly ("connector") 78I attached thereto. Proximal end 74I runs through one of side openings 40S and is operably connected to input end 52 of the nearest or most upstream ferrule offset assembly 50. Apparatus 10 also includes a length (e.g., 1 m) of output multimode fiber 70O that includes a section 72O having proximal end 74O, and a distal end 76O with a connector 78O attached thereto. Proximal end 74O runs through on of openings 40S and is operably connected to the output end 54 of the farthest or most downstream ferrule offset assembly 50.

With reference to FIG. 3, apparatus 10 further includes one or more lengths or sections (e.g., 8 m) of connecting multimode fiber 70C that connects the output end of an upstream ferrule offset assembly 50 to the input end of the adjacent downstream ferrule offset assembly. Connecting multimode fiber 70C is coiled within interior 28 of bottom housing section 24 and is generally maintained internal to housing 20. In an example embodiment, housing 20 is sized so that at one or more connecting multimode fibers 70C can be coiled within interior 28 without exceeding the bending radius of the fiber. Thus, the multiple ferrule offset assemblies 50 are connected in series via sections of connecting multimode fibers 70C.

Figure 5:
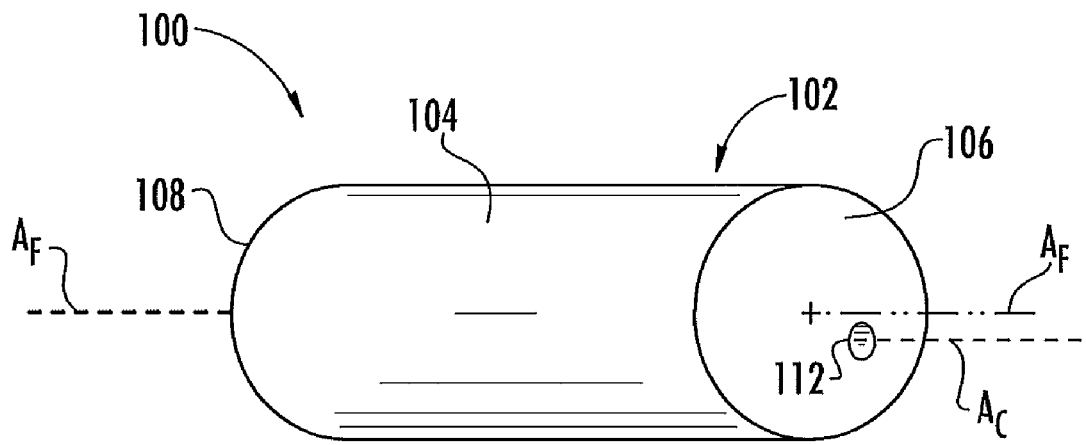
FIG. 5 is a schematic perspective view and FIG. 6 is a schematic end-on view of an example cylindrical offset ferrule, illustrating how the fiber channel is radially offset from the ferrule central axis.
Figure 6:
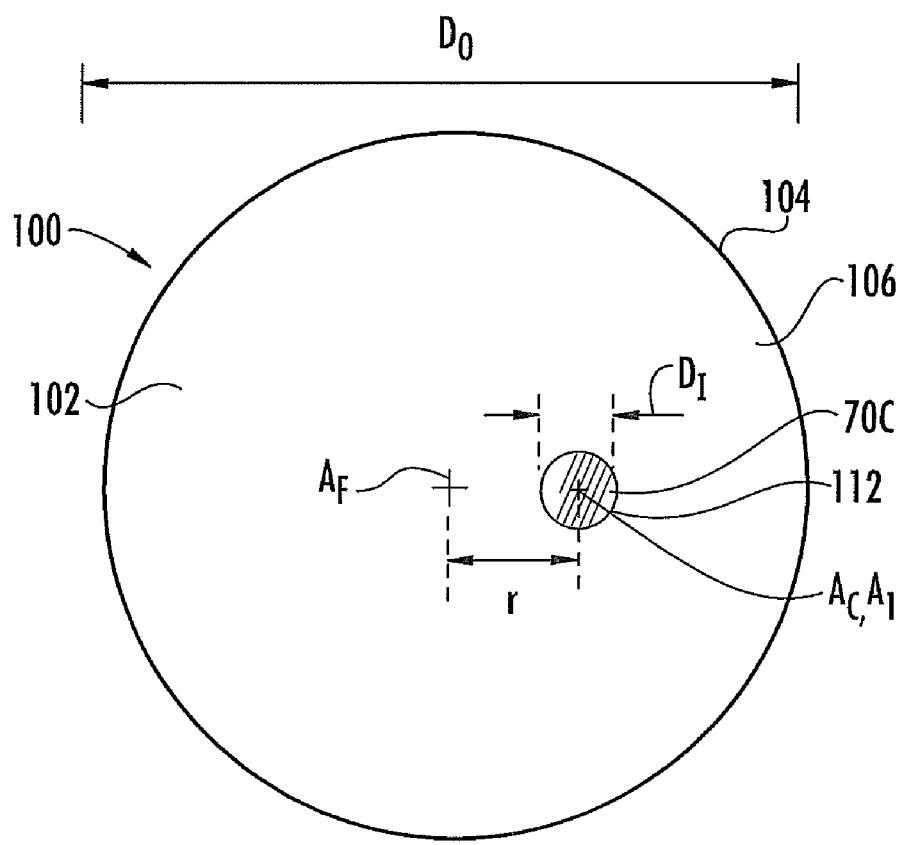

FIG. 5 is a schematic perspective view and FIG. 6 is a face-on view of an example ferrule 100 used in ferrule offset assembly 50. Ferrule 100 includes a cylindrical ferrule body 102 having an outer surface 104 that defines an outer diameter $D_O$, front and back surfaces 106 and 108, a central axis $A_F$, and a fiber channel 112 with an inner surface 114 that defines an inner diameter $D_I$. Fiber channel 112 is sized to accommodate a multimode fiber. Fiber channel 112 has a central channel axis $A_C$ that is offset from (i.e., is eccentric relative to) ferrule (central) axis $A_F$ by a distance r. Thus, this particular type of ferrule 100 is referred to hereinafter as "offset ferrule" 100.

Figure 7:
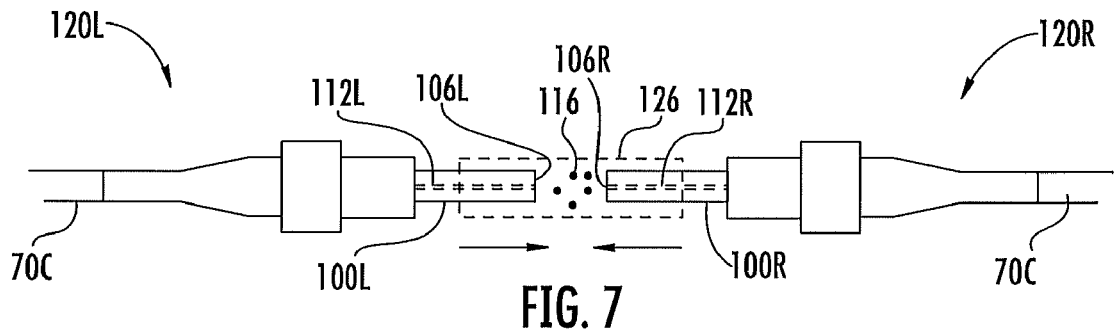
FIG. 7 is a side view of two opposing optical fiber connectors that are maintained with their respective ferrule axes in alignment using a guide sleeve that allows at least one of the offset ferrules residing therein to rotate.

With reference to FIG. 7, ferrule offset assembly 50 includes two offset ferrules 100 (denoted 100L and 100R for "left" and "right" for the sake of reference) arranged in opposition with their respective ends 106L and 106R in contact. In an example embodiment, an index matching gel 116 is provided between offset-ferrule ends 106L and 106R. With reference also to FIG. 8A through FIG. 8C and FIG. 9, in an example embodiment, offset ferrules 100L and 100R are each held within respective connectors 120 (denoted 120L and 120R). In an example embodiment, connectors 120 are one of the types of connector used in the fiber cable industry, such as an FC connector as shown in FIG. 8A, an SC connector as shown in FIG. 8B, or an LC connector as shown in FIG. 8C.

Ferrule offset assembly 50 is configured to allow one offset ferrule 100 to axially rotate relative to the other while maintaining contact at ends 106 with the appropriate pressure. In an example embodiment, ferrule offset assembly 50 includes a guide sleeve 126 into which ferrule ends 106L and 106L are inserted and within which at least a portion of ferrules 100L and 100R reside so that the respective ferrule axes $A_F$ are maintained in alignment with one another while at least one of the offset ferrules is free to rotate about its ferrule axis $A_F$.

Figure 9:
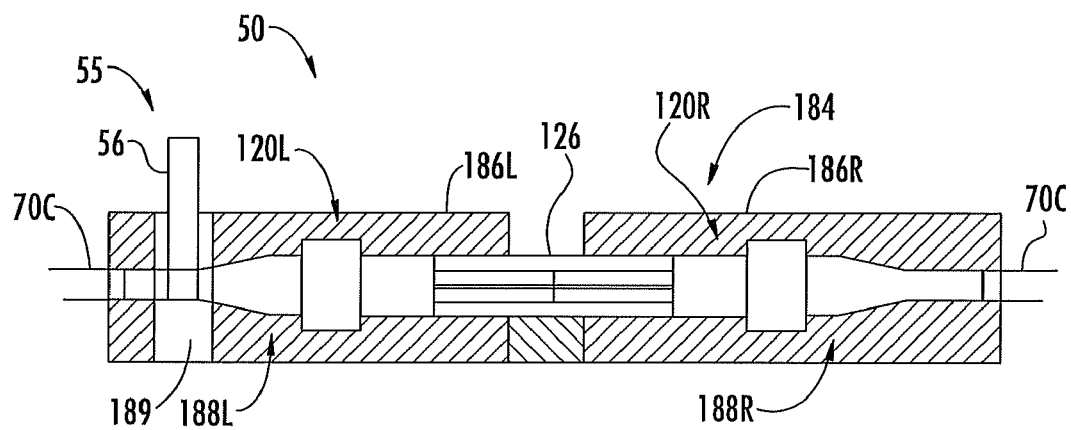
FIG. 9 is a cross-sectional view of an example ferrule offset assembly used to hold the two opposing optical fiber connectors of FIG. 7 and configured to provide rotation of one offset ferrule relative to the other.

FIG. 9 is a cross-sectional view of an example ferrule offset assembly 50 that includes offset ferrules 100L and 100R operably disposed in opposition within guide sleeve 126, as described above in connection with FIG. 7. Offset ferrules 100L and 100R are incorporated into respective connectors 120L and 120R, which are respectively supported by right and left sections 186R and 186L of a support structure 184. Right section 186R includes a cavity 188R sized to hold connector 120R in place within support structure 184 so that offset ferrule 100R does not rotate within ferrule guide 126. Left section 186L includes a cavity 188L sized to hold connector 120L within support structure 184 but allows the connector to rotate within cavity 188L so that offset ferrule 100L can rotate within ferrule guide 126. Lever 56 is mechanically coupled to connector 120L (e.g., is attached thereto) and is configured to cause the connector to rotate when the lever is moved. Left section 186L includes a lateral opening 189 within which lever 56 can be moved up and down when rotating connector 120L.

In an alternative example embodiment, left section 186L is rotationally engaged with right section 186R so that the left section can rotate with respect to the right section. In this embodiment, lever 56 is attached to left section 186L and connector 120L is fixed within the left section and rotates along with it. In one example, guide ferrule 126 is configured to rotate with left section 186L, while in another example is configured to remain stationary (e.g., remains fixed with respect to right section 186R).

Figure 10:
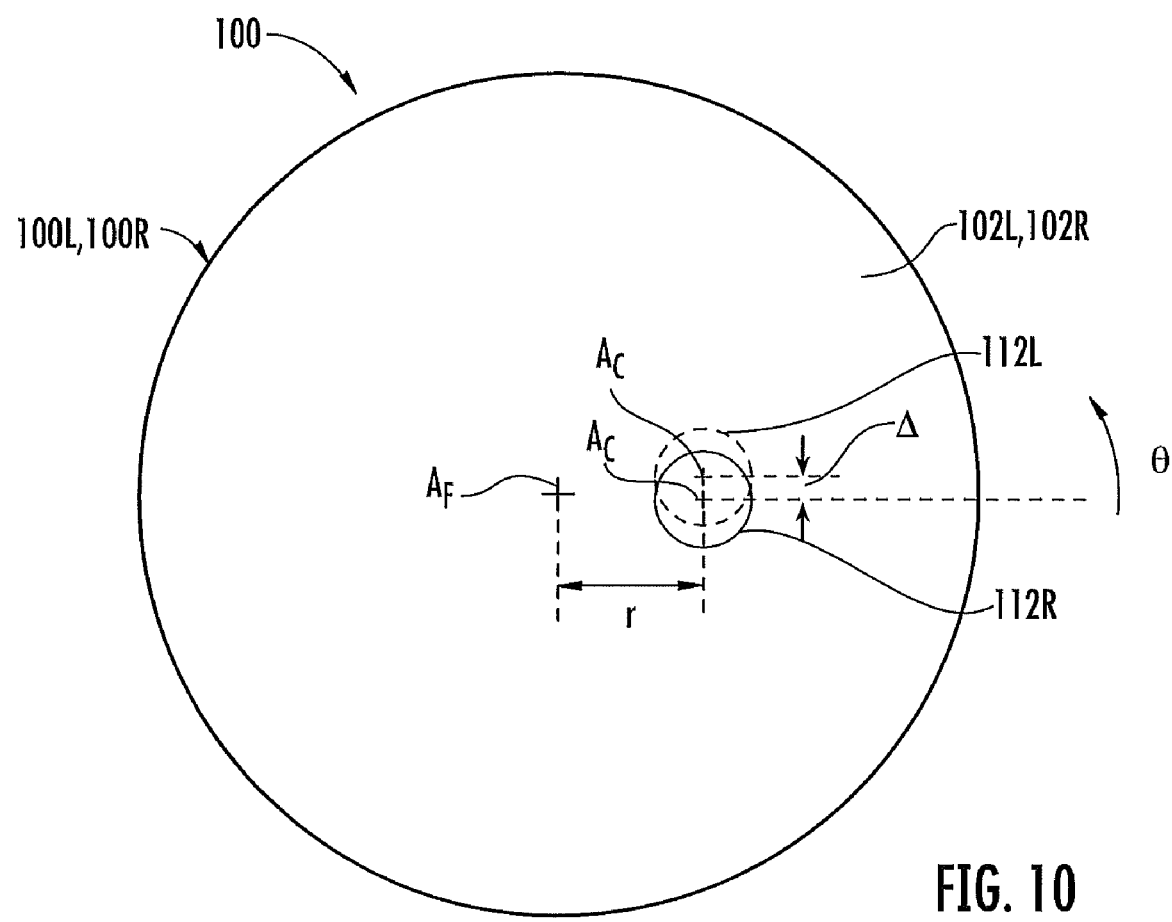
FIG. 10 is similar to FIG. 6, and schematically illustrates the rotation of one offset ferrule relative to the other so that there is an offset Δ A between the respective fiber channel axes and thus the axes of the multimode fibers disposed in the respective fiber channels.

With reference to FIG. 10, at the zero offset position (i.e., offset rotation angle θ=0°) channel axes $A_C$, and thus the fiber axes $A_1$ of the connecting multimode fibers disposed within channels 112, are aligned. As one offset ferrule 100 (say, 100L) is rotated around the ferrule axis $A_F$, the offset between fiber channels 112L and 112R and thus connector multimode fibers 70C disposed within the respective channels increases, as illustrated by the dashed-line fiber channel 112L. The offset increases with rotation angle θ, where a select rotation angle $θ_S$ yields a select distance offset Δ. The amount of distance offset Δ is related to the eccentricity r and ferrule rotation angle θ by the relationship Δ=2r sin(θ/2). In an example embodiment, ferrule offset assembly 50 has two angular settings (i.e., is binary): no offset (θ=0°) and one other select offset (θ=$θ_S$), which correspond to binary fiber-channel offsets of Δ=0 and Δ=$Δ_S$, where $Δ_S$ is a select distance offset. In another example embodiment, ferrule offset assembly 50 includes two or more offset settings besides the "no offset" setting.

Note that $θ_S$ and $Δ_S$ are not necessarily the maximum possible angular and distance offsets. Typical distance offsets Δ (besides the no-offset setting of 0 μm) range from 0.5 μm to 7 μm, with one example offset being in the range from about 1.5 μm to about 2.5 μm, and another more specific example being about 2.1 μm for each ferrule offset assembly 50. The offset settings (both angular θ and distance Δ) for the different ferrule offset assemblies 50 need not be the same, but in an example embodiment are the same. In example embodiments, the number of ferrule offset assemblies 50 ranges from one to ten, with two to seven being preferable, and five representing an exemplary embodiment that should be suitable for most field measurement applications and devices. Note that an example apparatus 10 having five ferrule offset assemblies 50 has four different connecting fiber 70C.

Ferrule offset assembly 50 includes an offset adjusting device 55, such as a lever arm 56, to initiate the relative rotation of offset ferrules 100 contained therein. The offset adjusting device 55 allows for rotation of one ferrule 100 (or the corresponding connector assembly 120) while maintaining spring pressure. Connectors 120 mounted into a support structure 184 that can rotate inside a fixed-width cavity 188 ("raceway") allow for rotation while maintaining contact pressure via an integral spring system (not shown) inherit in certain types of connectors 120, such as those illustrated in FIG. 8A, FIG. 8B and FIG. 8C.

Ferrule offset assembly 50 has been described above in an example lever-based configuration that uses rotation to cause an offset between respective connector multimode fibers 70, namely between input multimode fiber 70I and connector multimode fiber 70C at the most upstream ferrule offset assembly, between connector multimode fiber 70C and output multimode fiber 70O at the most downstream ferrule offset assembly, and between connector multimode fibers 70C between ferrule offset assemblies. However, the present disclosure includes other methods of creating the aforementioned fiber offset.

Figure 11:
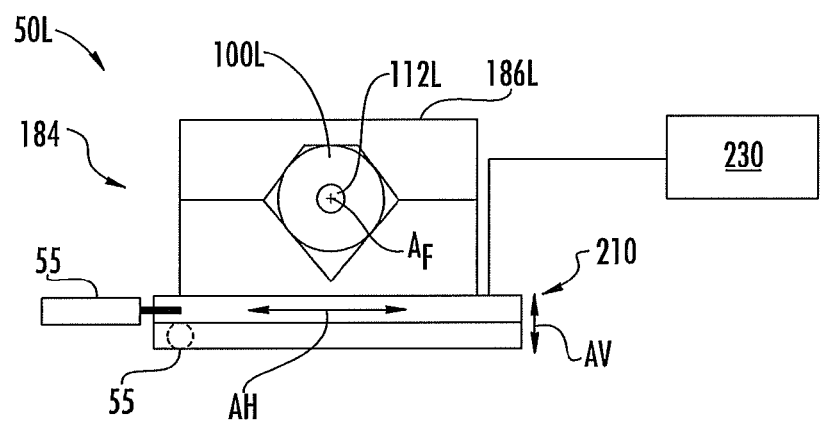
FIG. 11 is a face-on view of the left side of an example ferrule offset assembly that employs a linear translation stage to linear translate the opposing ferrules relative to one another to create the fiber channel offset.

For example, with reference to FIG. 11, there is shown a face-on view of the left side 50L of an example ferrule offset assembly 50 that employs a linear translation stage 210. In this embodiment, ferrule 100L has its fiber channel axis $A_C$ aligned with ferrule axis $A_F$. Ferrule 100L is held in position in left section 186L of support structure 184, with the left section being supported by a linear translation stage 210. Vertical and horizontal translations of left section 186L are indicated by arrows AV and AH.

Figure 12:
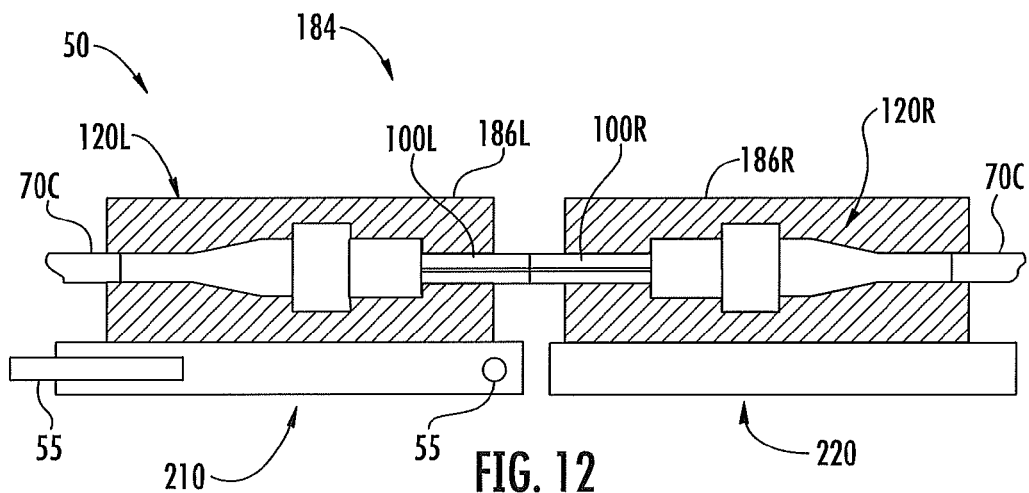
FIG. 12 is similar to the side view of FIG. 9 and shows both left and right sections of the support structure, where the right section is supported by a fixed stage and the left section is able to linearly translate relative to the right section.

FIG. 12 is similar to the side view of FIG. 9 and shows both left and right sections 186L and 186R of support structure 184, where right section 186R is supported by a fixed stage 220. Left and right sections 186L and 186R are configured to linearly translate relative to one another via the action of translation stage 210. Note that fiber guide 126 is no longer used to keep the ferrule axes $A_F$ of right and left ferrules 100L and 100R aligned since one ferrule needs to be shifted relative to the other.

In example embodiments, translation stage 210 has one-dimensional, (1D), two-dimensional (2D) and three-dimensional (3D) translation capability. Suitable one-axis, two-axis and three-axis precision translation stages for use in this linear-offset embodiment for offset assembly 50 are available, for example, from nPoint, Inc., Madison, Wis. In an example embodiment, translation stage 210 is configured to provide select amounts of linear translation. This is accomplished in one example by having translation stage 210 be electronically controlled via a controller 230 configured to provide precise translations, e.g., via piezo-electric-based actuators (not shown). In another example embodiment, the select offsets are provided manually via one or more offset adjusting devices 55, which in an example is one or more micrometer-type dials.

Figure 13:
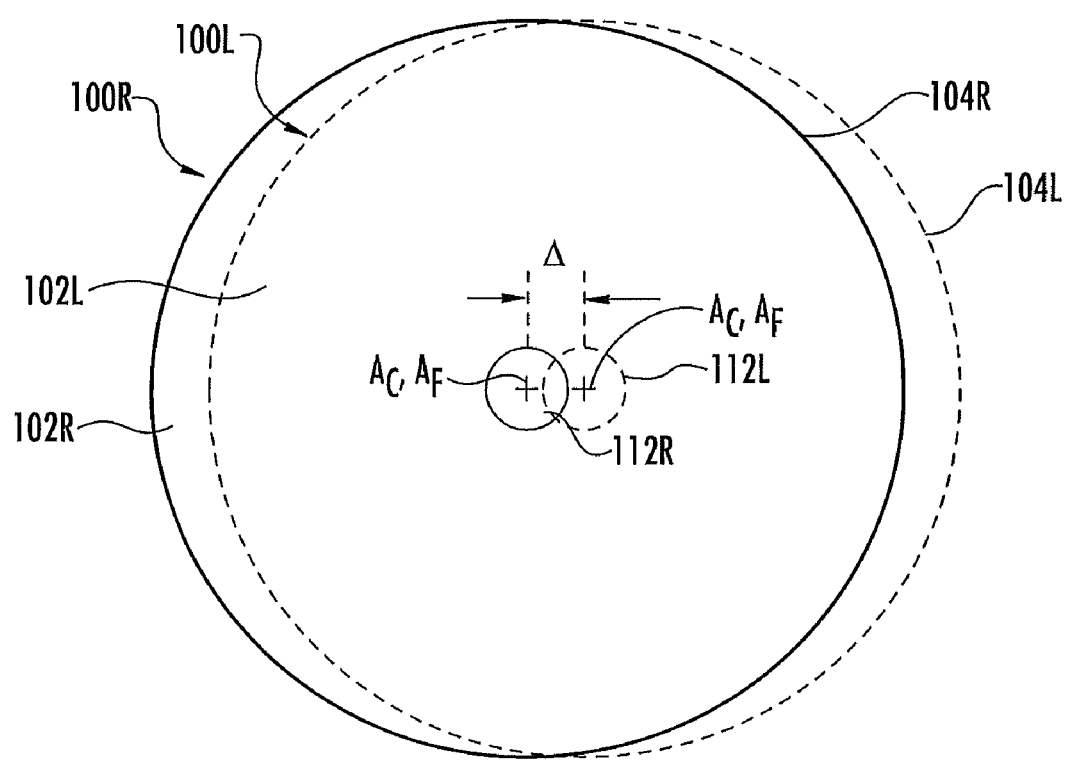
FIG. 13 is a schematic diagram similar to FIG. 10 and shows the two opposing ferrules as being linear translated related to one another using the linear-translation offset assembly of FIG. 11 and FIG. 12.

FIG. 13 is a schematic diagram similar to FIG. 10 and shows the two opposing ferrules 100 as being linear translated related to one another using the linear-translation offset assembly 50 to form a distance offset Δ between fiber channels 112L and 112R and thus respective fiber axes $A_C$.

FIG. 14 through FIG. 19 are schematic diagrams of apparatus 10 being used to carry out an example method of measuring the attenuation of a launch multimode fiber connected to a device having a light source, with the different Figures illustrating different fiber offset settings of the apparatus as represented by the different positions of lever 56.

With reference to FIG. 14 through FIG. 19, input multimode fiber 70I is connected to one end of a launch multimode fiber 70L, which is connected at its other end to a device 210 that includes a light source 212. Output multimode fiber 70O is connected to a power meter 220, such as a photodetector. Device 210 and launch multimode fiber 70L have associated attenuation reference data that, for example, is based on a factory test of the device and the same type of multimode fiber 70. Often, the attenuation reference data is provided with the device, e.g., on the device packaging or housing. The attenuation reference data typically include one or more threshold attenuations that represents an acceptable attenuation range for the combination of device 210 and launch multimode fiber 70L.

Figure 14:
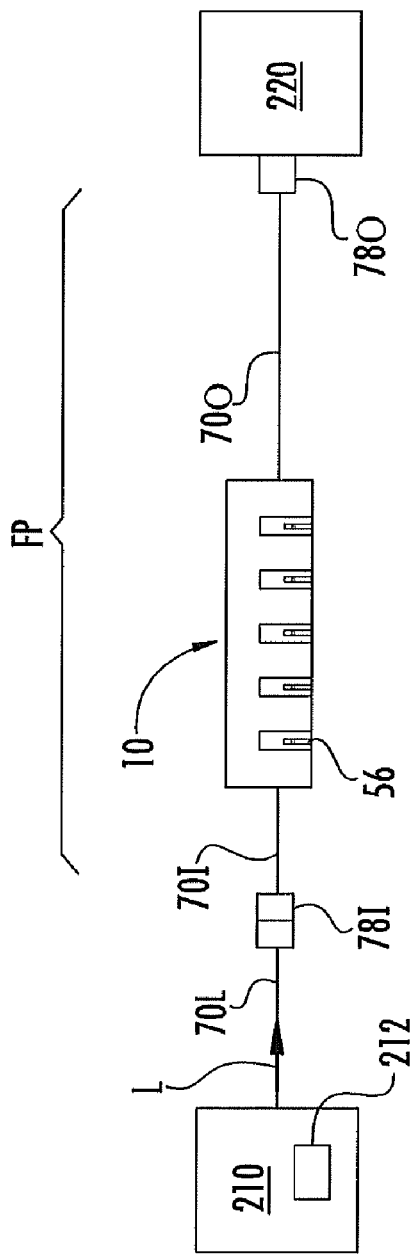

Prior to measuring the attenuation of launch multimode fiber 70L using apparatus 10, all of the ferrule offset assemblies 50 are set to zero via levers 56, as shown in FIG. 14. Device 210 is then activated so that light L travels from light source 212 in device 210 and through launch fiber 70L and then through an optical fiber path FP associated with apparatus 10, i.e., through input multimode fiber 70I, through connecting multimode fibers 70C, through output multimode fiber 70O and then to power meter 220. The measured power with all offsets set to zero serves as a baseline. The transmission of optical fiber path FP is then adjustable by adjusting apparatus 10 to provide different fiber offsets Δ.

In an example embodiment, the different fiber offsets Δ are performed sequentially in the upstream to downstream direction, i.e., the most upstream ferrule offset assembly 50 is adjusted, then the second-most upstream ferrule offset assembly is adjusted, etc. until the most downstream ferrule offset assembly is adjusted, so that the optical fiber path FP includes a concatenation of all the fiber offsets.

Figure 15:
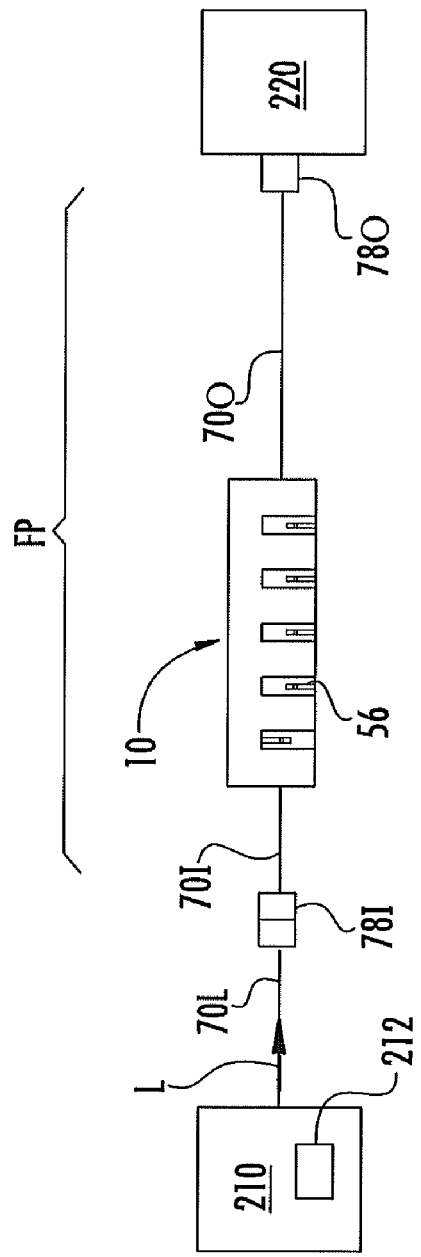
Figure 16:
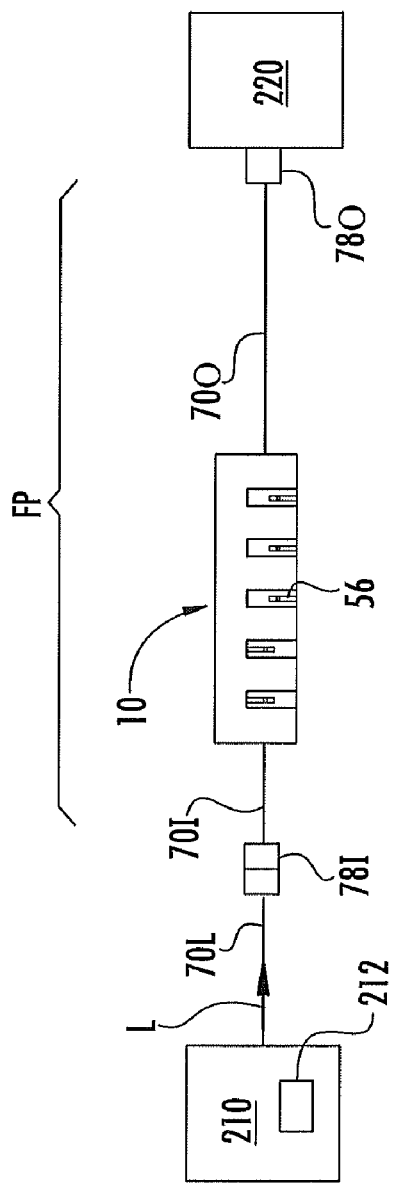
Figure 17:
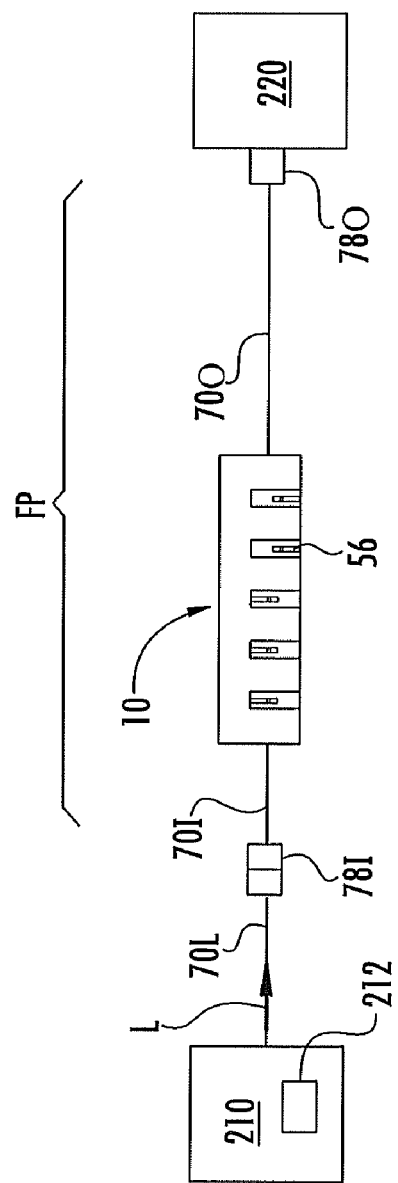

Thus, with reference to FIG. 15, the first or most upstream ferrule offset assembly 50 is set to provide a select offset (i.e., select angular offset $\theta_S$ corresponding to select fiber-channel distance offset $\Delta_S$) via the corresponding lever 56, and the transmitted power measured using power meter 220. With reference to FIG. 16, the second (i.e., second-most upstream) ferrule offset assembly 50 is set to a select offset and the transmitted power is once again measured using power meter 220. This process is repeated for the remaining ferrule offset assemblies as shown in FIG. 17 through FIG. 19 until all ferrule offset assemblies 50 are set to the select offsets, which represents a concatenation of the five fiber offsets. This automated offset process efficiently replicates the process of manually concatenating a series of separate jumper cables with different fiber offsets. The relative measured powers represent attenuation data, which is compared to the attenuation reference data associated with device 210 to see if the combination of the device and the launch multimode fiber 70L attached thereto are performing within the attenuation specification.

It will be apparent to those skilled in the art that various modifications to the preferred embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An apparatus for attenuating light passed through a launch multimode fiber and detected by a power meter, comprising:

at least one ferrule offset assembly having opposing first and second ferrules with respective first and second ends and first and second fiber channels maintained in general relative and adjustable alignment, and an offset adjusting device adapted to adjust the relative alignment of the first and second fiber channels to create at least one select fiber channel alignment offset, the first and second ferrules have respective first and second central ferrule axes maintained in alignment, the first and second fiber channels have respective first and second central fiber channel axes, the first and second fiber channel axes are radially offset from the respective first and second ferrule axes so that the at least one select fiber channel alignment offset is provided by rotating the first ferrule about its central ferrule axis and the offset adjusting device includes a lever mechanically coupled to one of the first and second ferrules and configured so that moving the lever causes a rotation of the corresponding first or second ferrule;

first and second multimode fibers having respective first and second ends disposed in the first and second fiber channels to have a fiber alignment corresponding to the fiber channel alignment; and wherein the first multimode fiber has an end configured to optically couple to the launch multimode fiber so as to receive the light therefrom, and wherein at least some of the light passes through the second multimode fiber to the power meter.

2. The apparatus of claim 1, comprising a plurality of ferrule offset assemblies optically connected in series by sections of multimode fiber.

3. The apparatus of claim 2, wherein each ferrule offset assembly includes a no-offset setting and at least one select offset setting.

4. The apparatus of claim 3, wherein the at least one select offset setting provides a fiber channel offset of between 0.5 µm and 7 µm.

5. The apparatus of claim 2, wherein the plurality of ferrule offset assemblies and the sections of multimode fibers are contained within a housing.

6. The apparatus of claim 1, wherein the opposing first and second ferrules are held by corresponding opposing first and second optical fiber connectors.

7. The apparatus of claim 6, wherein the opposing first and second optical fiber connectors are operably supported by a support structure configured to allow for operation of the offset adjusting device.

8. The apparatus of claim 1, wherein the first and second ferrules are contained within a guide sleeve configured to maintain the opposing first and second ferrules in general axial alignment.

9. An apparatus for attenuating light passed through a launch multimode fiber and detected by a power meter, comprising:
a plurality of ferrule offset assemblies optically connected in series by sections of multimode fibers and configured to provide substantially no offset and at least one select offset between adjacent multimode fiber sections via the operation of respective offset adjusting devices;
an input multimode fiber optically connected to the most upstream ferrule offset assembly and configured to be optically connectable to the launch multimode fiber; and
an output multimode fiber optically connected to the most downstream ferrule offset assembly and configured to be optically connectable to the power meter.

10. The apparatus of claim 9, further including the power meter optically connected to the output optical fiber.

11. The apparatus of claim 9, wherein at least one of the ferrule offset assemblies includes opposing offset ferrules having respective aligned central ferrule axes and respective offset fiber channels that hold respective ends of respective multimode fiber sections, with the at least one ferrule offset assembly configured to rotate at least one of the offset ferrules to create the at least one select fiber offset.

12. The apparatus of claim 11, wherein the opposing offset ferrules are held by corresponding opposing optical fiber connectors.

13. The apparatus of claim 12, wherein the opposing optical fiber connectors are operably supported by a support structure configured to allow for relative rotation of the opposing optical fiber connectors about the aligned ferrule axes.

14. A method of attenuating light passed through a launch multimode fiber connected to a device having a light source, comprising:
introducing the light passed from the light source and through the launch multimode fiber into an input end of an optical fiber path comprising sections of multimode fibers arranged in series and configured to provide substantially no offset and at least one select offset between adjacent multimode fiber sections via the operation of at least one offset adjusting device;
adjusting the fiber offsets;
for each fiber offset adjustment, measuring an amount of output power at an output end of the optical fiber path; and
determining an attenuation from the measured amounts of output power.

15. The method of claim 14, further comprising:
sequentially adjusting the fiber offsets in a direction from upstream to downstream relative to the light source, starting with no fiber offsets and ending with a concatenation of fiber offsets.

16. The method of claim 14, wherein adjusting the fiber offsets includes axially rotating at least one of two opposing ferrules having offset fiber channels that contain ends of the adjacent multimode fiber sections.

17. The method of claim 16, wherein the offset adjusting device includes a lever configured to cause rotation of one of the two opposing ferrules.

18. The method of claim 14, including holding the opposing ferrules in respective optical fiber connectors.

* * * * *